United States Patent
Yanase (10) Patent No.: US 7,305,288 B2
(45) Date of Patent: Dec. 4, 2007

(54) METHOD AND APPARATUS FOR DETECTING DECREASE IN TIRE AIR-PRESSURE, AND PROGRAM FOR JUDGING DECOMPRESSION OF TIRE

(75) Inventor: Minao Yanase, Kobe (JP)

(73) Assignee: Sri Sports Limited, Kobe (JP)

( * ) Notice: Subject to any disclaimer, the term of this patent is extended or adjusted under 35 U.S.C. 154(b) by 280 days.

(21) Appl. No.: 10/842,579

(22) Filed: May 11, 2004

(65) Prior Publication Data

US 2004/0249528 A1     Dec. 9, 2004

(30) Foreign Application Priority Data

Jun. 9, 2003     (JP)     ............... 2003-164081

(51) Int. Cl.
G06F 19/00     (2006.01)
B60C 23/00     (2006.01)

(52) U.S. Cl. ............... 701/29; 340/442; 73/146; 73/146.5

(58) Field of Classification Search ............... 701/1, 701/29; 340/442–445; 73/146, 146.5
See application file for complete search history.

(56) References Cited

U.S. PATENT DOCUMENTS

| | | | | |
|---|---|---|---|---|
| 5,826,210 | A * | 10/1998 | Izumi et al. | ............... 701/70 |
| 6,388,568 | B1 * | 5/2002 | Arita et al. | ............... 340/442 |
| 6,407,661 | B2 * | 6/2002 | Arita et al. | ............... 340/444 |
| 6,420,966 | B2 * | 7/2002 | Sugisawa | ............... 340/442 |
| 6,504,475 | B2 * | 1/2003 | Sugisawa | ............... 340/444 |
| 6,774,776 | B2 * | 8/2004 | Yanase | ............... 340/444 |
| 6,804,623 | B2 * | 10/2004 | Oshiro | ............... 702/140 |
| 6,836,709 | B2 * | 12/2004 | Oshiro et al. | ............... 701/29 |
| 7,032,442 | B2 * | 4/2006 | Yanase | ............... 73/146 |
| 7,057,526 | B2 * | 6/2006 | Yanase | ............... 340/870.16 |
| 7,117,074 | B2 * | 10/2006 | Sugisawa | ............... 701/29 |
| 2005/0087008 | A1 * | 4/2005 | Yanase | ............... 73/146 |

FOREIGN PATENT DOCUMENTS

| | | |
|---|---|---|
| JP | 4-135903 A | 5/1992 |
| JP | 6-8713 A | 1/1994 |
| JP | EP 0 716 941 A | 6/1996 |
| JP | 9-240226 A | 9/1997 |

(Continued)

*Primary Examiner*—Gary Chin
(74) *Attorney, Agent, or Firm*—Birch, Stewart, Kolasch & Birch, LLP (57) ABSTRACT

A method for detecting decrease in tire air-pressure on the basis of wheel rotational information obtained from tires attached to a four-wheeled vehicle. The method includes the steps of: obtaining wheel rotational information obtainable from the respective tires, storing the wheel rotational information, and judging decrease in air-pressure of a tire. The step of judging decrease in air-pressure includes the step of adjusting a sensitivity of judgment upon multiplying a specified sensitivity coefficient to the wheel rotational information of the respective wheels of a front axis or those of the respective wheels of a rear axis of the vehicle and of judging a running condition of the vehicle. When it is determined that the vehicle is performing straight-ahead running, the judgment of decrease in tire air-pressure is performed only on the basis of wheel rotational information when performing straight-ahead running. It is possible to maintain detection accuracy of decrease in tire air-pressure and to prevent erroneous alarm.

6 Claims, 7 Drawing Sheets

FOREIGN PATENT DOCUMENTS

| | | |
|---|---|---|
| JP | 9-249010 A | 9/1997 |
| JP | 10-100622 A | 4/1998 |
| JP | 10 151919 A | 9/1998 |
| JP | 10-258618 A | 9/1998 |
| JP | 2001-206028 A | 7/2001 |
| JP | 2002-234320 A | 8/2002 |

* cited by examiner

METHOD AND APPARATUS FOR DETECTING DECREASE IN TIRE AIR-PRESSURE, AND PROGRAM FOR JUDGING DECOMPRESSION OF TIRE

This Non-provisional application claims priority under 35 U.S.C. § 119(a) on Patent Application No(s). 2003-164081 filed in Japan on Jun. 9, 2003, the entire contents of which are hereby incorporated by reference.

BACKGROUND OF THE INVENTION

The present invention relates to a method and an apparatus for detecting decrease in tire air-pressure as well as to a program for judging decompression of a tire. More particularly, it relates to a method and an apparatus for detecting decrease in tire air-pressure as well as to a program for judging decompression of a tire with which it is possible to accurately detect decrease in air-pressure of a tire.

An apparatus for detecting decrease in tire air-pressure (DWS) conventionally employs a theory that a rotational angular velocity of a decompressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires, $$DEL=\{(F1+F4)/2-(F2+F3)/2\}/\{(F1+F2+F3+F4)/4\} \times 100(\%)$$

is employed as a judged value DEL (Japanese Unexamined Patent Publication No. 305011/1988). Here, F1 to F4 denote rotational angular velocities of a front left tire, a front right tire, a rear left tire and a rear right tire, respectively.

Since changes in the dynamic load radii of tires owing to decompression vary depending types of tires or position of mounting the same, it is necessary to detect which of the tire is decompressed for making alarm to be issued when a specified decompression rate has been reached. However, such determination of a decompressed wheel is technically difficult. Accordingly, in a method for judging decompression of a tire on the basis of changes in dynamic load radii of tires, a considerably large tolerance of, for instance, ±10% is provided for a decompression rate for alarm of, for instance, 30%, since decompression rates for issuing alarm fluctuate depending on types of tires and influences of mounting positions. However, since dynamic load radii of tires fluctuate, in addition to influences of air-pressure or types of tires, also through influences of load, slip angle, camper angle, driving force or braking force, erroneous alarm might still be issued in spite of normal air-pressure even when providing a large tolerance for the decompression rate for alarm.

There is known a method for improving the accuracy of alarm as a method for solving such a problem wherein the level of alarm is made constant regardless of the position of the tires by correcting the judged value for alarm by using position sensitivity coefficients depending on mounting positions of tires (Japanese Unexamined Patent Publication No. 151919/1998).

In the prior art method, a sensitivity coefficient is multiplied to wheel speeds of respective tires for making the decompression sensitivity constant (uniform) so that alarm might be issued at a constant decompression rate without determining a position of a decompressed wheel. However, there is a risk that shifts in judged values are caused at the time of performing turning movements so that erroneous alarm is issued by multiplying a sensitivity coefficient other than "1" to the wheel speeds.

SUMMARY OF THE INVENTION

The present invention has been made in view of the above circumstances, and it is an object thereof to provide a method and an apparatus for detecting decrease in tire air-pressure as well as a program for judging decompression of a tire with which it is possible to maintain a detection accuracy of decrease in tire air-pressure and with which erroneous alarm can be prevented.

In accordance with a first aspect of the present invention, there is provided a method for detecting decrease in tire air-pressure on the basis of wheel rotational information obtained from tires attached to a four-wheeled vehicle, which includes the steps of: obtaining wheel rotational information which can be obtained from the respective tires; storing the wheel rotational information, and judging decrease in air-pressure of a tire, wherein the step of judging decrease in air-pressure includes the step of adjusting a sensitivity of judgment upon multiplying a specified sensitivity coefficient to the wheel rotational information of the respective wheels of a front axis or those of the respective wheels of a rear axis of the vehicle and of judging a running condition of the vehicle, and wherein when it is determined that the vehicle is performing straight-ahead running, the judgment of decrease in tire air-pressure is performed only on the basis of wheel rotational information when performing straight-ahead running.

In accordance with a second aspect of the present invention, there is provided a method for detecting decrease in tire air-pressure on the basis of wheel rotational information obtained from tires attached to a four-wheeled vehicle, which includes the steps of: obtaining wheel rotational information which can be obtained from the respective tires; storing the wheel rotational information; and judging decrease in air-pressure of a tire, wherein the step of judging decrease in air-pressure includes the step of adjusting a sensitivity of judgment upon multiplying a specified sensitivity coefficient to the wheel rotational information of the respective wheels of a front axis or those of the respective wheels of a rear axis of the vehicle and of judging a running condition of the vehicle, and wherein a judged value for judging decrease in tire air-pressure when performing turning movements is corrected when it is determined that the vehicle is performing turning movements.

In accordance with a third aspect of the present invention, there is provided an apparatus which is so arranged to detect decrease in tire air-pressure on the basis of wheel rotational information obtained from tires attached to a four-wheeled vehicle, which includes: rotational information detecting means which obtain wheel rotational information obtainable from the respective tires; a storing means which stores the wheel rotational information; and a decompression judging means which judges decrease in air-pressure of a tire, wherein the decompression judging means includes a sensitivity adjusting means which adjusts a sensitivity of judgment upon multiplying a specified sensitivity coefficient to the wheel rotational information of the respective wheels of a front axis or those of the respective wheels of a rear axis of the vehicle, a running judging means which judges a running condition of the vehicle, and a decompression judgment starting means which performs judgment of decrease in tire air-pressure, when it is determined that the vehicle is performing straight-ahead running, only on the basis of wheel rotational information when performing straight-ahead running.

In accordance with a fourth aspect of the present invention, there is provided an apparatus which is so arranged to detect decrease in tire air-pressure on the basis of wheel rotational information obtained from tires attached to a four-wheeled vehicle, which includes: rotational information detecting means which obtain wheel rotational information obtainable from the respective tires; a storing means which stores the wheel rotational information; and a decompression judging means which judges decrease in air-pressure of a tire, wherein the decompression judging means includes a sensitivity adjusting means which adjusts a sensitivity of judgment upon multiplying a specified sensitivity coefficient to the wheel rotational information of the respective wheels of a front axis or those of the respective wheels of a rear axis of the vehicle, a running judging means which judges a running condition of the vehicle, and a correcting means which corrects the judged value when performing turning movements obtained by the compression judging means when it is determined that the vehicle is performing turning movements.

In accordance with a fifth aspect of the present invention, there is provided a program, in which for judging decrease in tire air-pressure on the basis of wheel rotational information obtained from tires attached to a four-wheeled vehicle, a computer is made to function as a storing means which stores the wheel rotational information, a decompression judging means which judges decrease in air-pressure of a tire, a sensitivity adjusting means which adjusts a sensitivity of judgment upon multiplying a specified sensitivity coefficient to the wheel rotational information of the respective wheels of a front axis or those of the respective wheels of a rear axis of the vehicle, a running judging means which judges a running condition of the vehicle, and a decompression judgment starting means which performs judgment of decrease in tire air-pressure, when it is determined that the vehicle is performing straight-ahead running, only on the basis of wheel rotational information when performing straight-ahead running.

In accordance with a sixth aspect of the present invention, there is provided a program in which, for judging decrease in tire air-pressure on the basis of wheel rotational information obtained from tires attached to a four-wheeled vehicle, a computer is made to function as a storing means which stores the wheel rotational information, a decompression judging means which judges decrease in air-pressure of a tire, a sensitivity adjusting means which adjusts a sensitivity of judgment upon multiplying a specified sensitivity coefficient to the wheel rotational information of the respective wheels of a front axis or those of the respective wheels of a rear axis of the vehicle, a running judging means which judges a running condition of the vehicle, and a correcting means which corrects the judged value when performing turning movements obtained by the compression judging means when it is determined that the vehicle is performing turning movements.

DETAILED DESCRIPTION

The method and apparatus for detecting decrease in tire air-pressure as well as the program for judging decompression of a tire of the present invention will now be explained with reference to the attached drawings.

Figure 1:
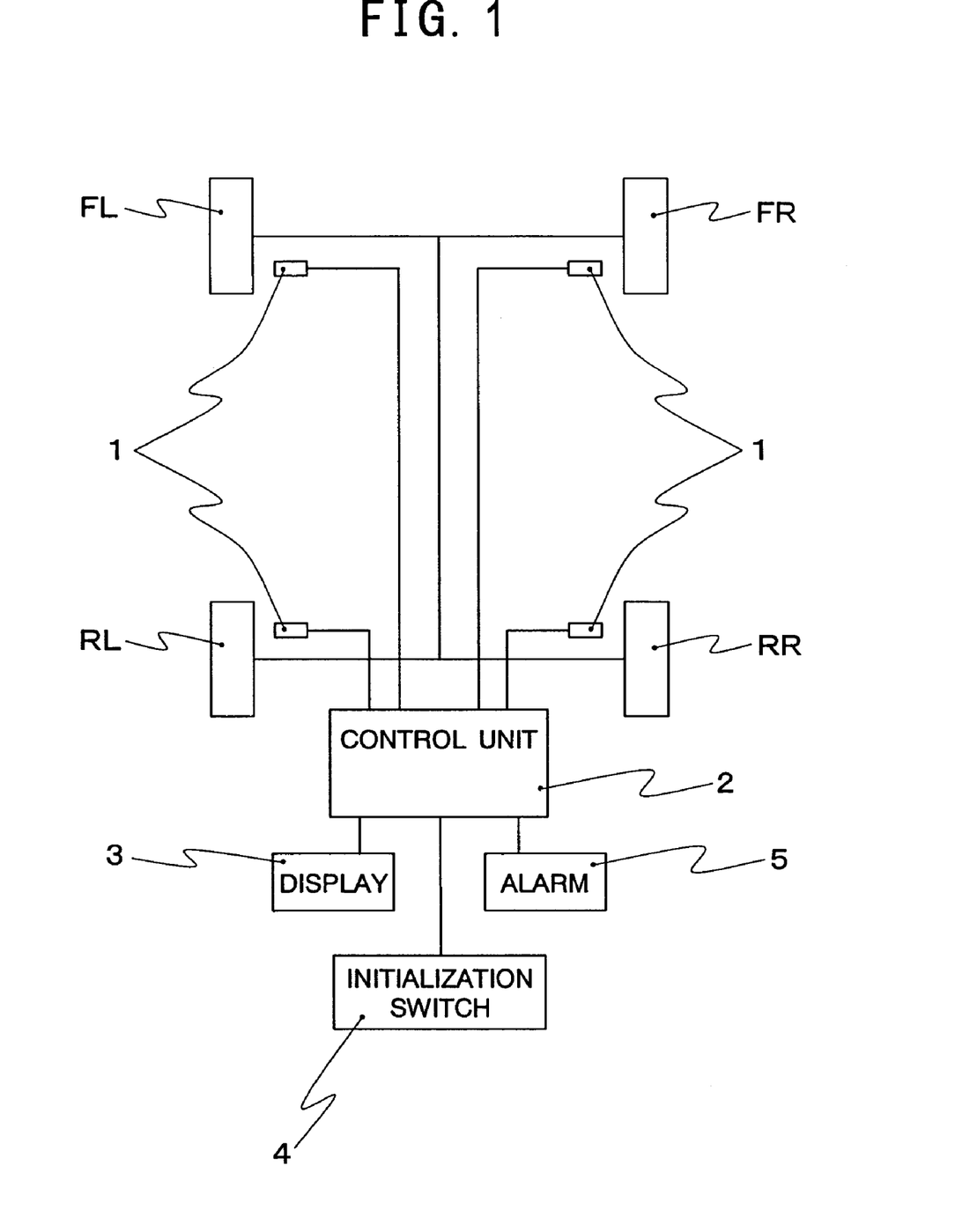
FIG. 1 is a block diagram illustrating one embodiment of the apparatus for detecting decrease in tire air-pressure according to the present invention.

As illustrated in FIG. 1, the apparatus for detecting decrease in tire air-pressure according to one embodiment of the present invention is for judging whether air-pressure of either of four tires FL, FR, RL and RR provided in a four-wheeled vehicle is decreased or not, and is provided with ordinary rotational information detecting means 1 respectively provided in relation to the respective tires.

The wheel speed detecting means 1 might be a wheel speed sensor for measuring rotational angular velocities and wheel speeds on the basis of number of pulses upon generating rotational pulses by using an electromagnetic pickup or similar, or an angular velocity sensor in which power is generated by using rotation such as in a dynamo, wherein the wheel speed is measured from a voltage thereof. Outputs of the wheel speed detecting means 1 are supplied to a control unit 2 which might be a computer such as an ABS. A display 3 comprising liquid crystal elements, plasma display elements or CRT for informing a tire of which tire air-pressure has decreased, an initialization switch 4 which might be operated by a driver, and an alarm 5 are connected to the control unit 2.

Figure 2:
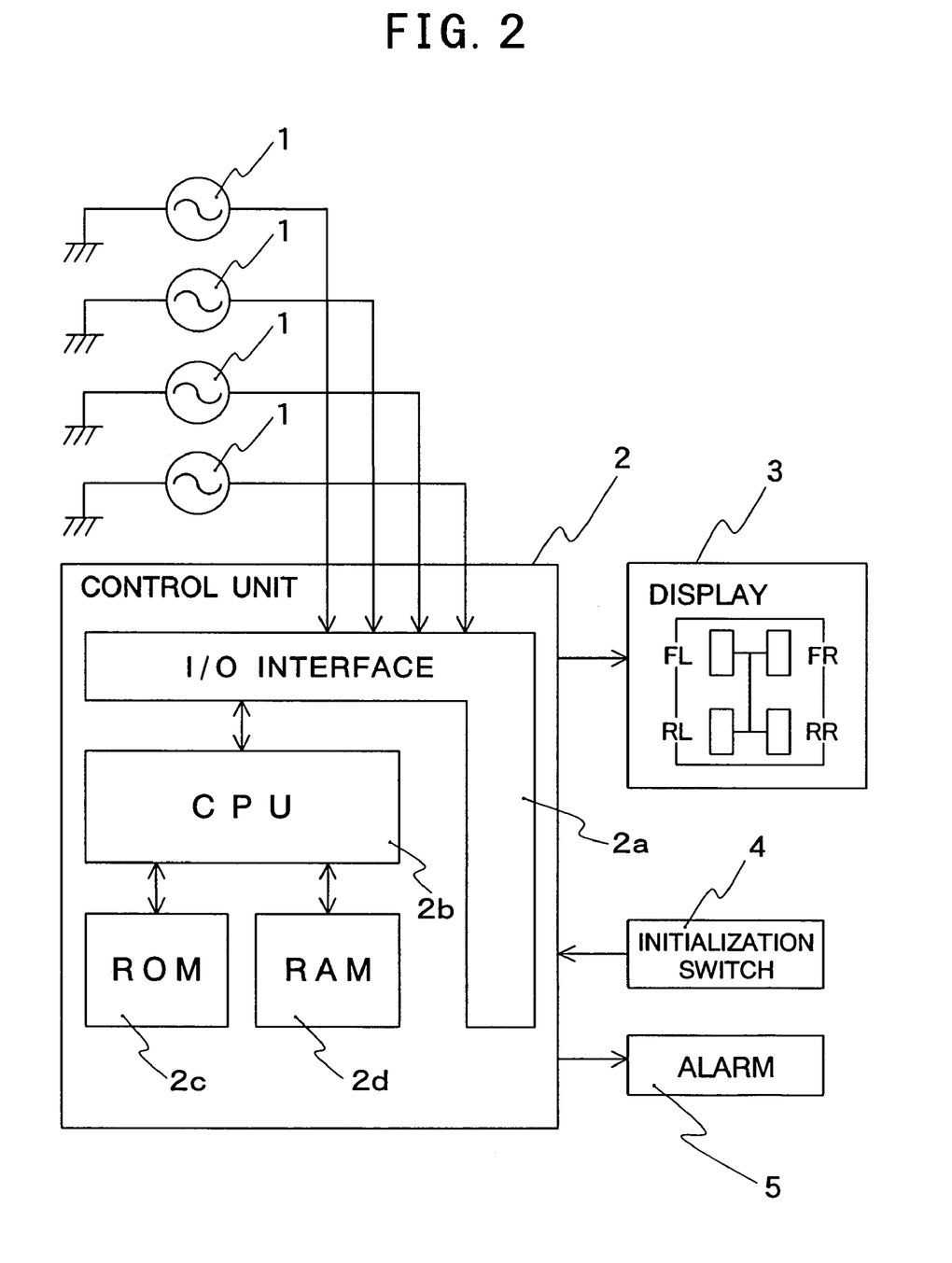
FIG. 2 is a block diagram illustrating electric arrangements of the apparatus for detecting decrease in tire air-pressure of FIG. 1.

As illustrated in FIG. 2, the control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of the tire (hereinafter referred to as "wheel speed pulse") are output in the wheel speed detecting means 1. In the CPU 2b, rotational angular velocities Fi for the respective tires are calculated on the basis of the wheel speed pulses as output from the wheel speed detecting means 1 at specified sampling periods $\Delta T$ (sec), for instance, $\Delta T=1$.

Since the tires are manufactured to include variations (initial differences) within standards, effective rolling radii of the respective tires (a value obtained by dividing a distance which has been traveled by a single rotation by $2\pi$) are not necessarily identical to one another even though all of the tires are at normal internal pressure. This will result in variations in the rotational angular velocities Fi of the respective tires. For example, there is a method for eliminating the influence of initial differences from the rotational angular velocities Fi. In this method, the following initial correction coefficients K1, K2 and K3 are first calculated.

$$K1=F1/F2 \quad (1)$$

$$K2=F3/F4 \quad (2)$$

$$K3=(F1+K1\times F2)/(F2+K2\times F4) \quad (3)$$

New rotational angular velocities F1i are then obtained as illustrated in equations (4) to (7) by using the calculated initial correction coefficients K1, K2 and K3.

$$F11=F1 \quad (4)$$

$$F12=K1\times F2 \quad (5)$$

$$F13=K3\times F3 \quad (6)$$

$$F14=K2\times K3\times F4 \quad (7)$$

Here, initial correction coefficient K1 is a coefficient for correcting differences in effect rolling radii owing to initial differences between right and left front tires. Initial correction coefficient K2 is a correction coefficient for correcting differences in effect rolling radii owing to initial differences between right and left rear tires. Initial correction coefficient K3 is a correction coefficient for correcting differences in effect rolling radii owing to initial differences between the front left tire and the right and left rear tires. Wheel speeds Vi of the tires of the respective wheels can be obtained on the basis of the F1i.

While changes in rotational angular velocities of wheels owing to decompression are usually dependent on sizes of tires, load applied to the tires and driving force/braking force acting on the tires, it is generally known that the sensitivity is decreased in cases in which load applied on tires is heavy and in cases in which driving force is applied on the tires. Taking a FF (front engine/front drive) vehicle as an example, since front wheels of a FF vehicle are applied with heavier load when compared to rear wheels and driving force acts thereon, the sensitivity thereof is decreased. When only a single threshold for alarm is set, for instance, such that alarm is issued with 30% decompression of a front wheel, an alarm will be issued in the presence of a decompression of approximately 10% of a rear wheel so that decompression rates for issuing alarm will be varied, and it might become difficult to make a decompression rate for issuing alarm fall into a constant narrow range. While it would be possible to set thresholds for each of the tires if it were possible to judge at which of the tires the decompression has occurred, it takes too much time for determining a position of a decompressed wheel on the basis of the present state of technology. The prior art method is so arranged, as described above, that the decompression sensitivity of the respective wheels is made constant (uniform) by multiplying a sensitivity coefficient to the wheel speeds, and alarm is made to issue at a constant decompression rate without determining a position of a decompressed wheel. However, it was found that where a sensitivity coefficient other than "1" is multiplied to the wheel speed, the judged value will be shifted during turning movements which might lead to erroneous alarm. While shifts in judged values during turning movements other than such shifts might be caused through load shift during turning movements or slip of a driving wheel on the inner side of turning, such shifts can be corrected by using the lateral G or a slip rate.

However, a shift which is caused by multiplying a sensitivity coefficient cannot be corrected by such methods.

The present embodiment is thus so arranged to eliminate influences of such shift in a system for judging decompression by multiplying a sensitivity coefficient and to maintain detection accuracy for preventing erroneous alarm, by judging straight-ahead running and eliminating data during turning movements or by correcting a judged value using sensitivity coefficient, tread width or turning radius when the data during turning movements are not to be eliminated (when performing turning movements).

In this respect, adjusting the sensitivity of judgment is performed in the present embodiment by multiplying a sensitivity coefficient to the wheel speeds of the respective wheels of the front axis (front wheels) or the respective wheels of the rear axis (rear wheels).

Further, a specified sensitivity coefficient is a coefficient (other than 1) which is multiplied to the wheel speeds to make the decompression sensitivity of the front wheels and rear wheels fall into specified ranges.

Accordingly, the present embodiment is composed of the rotational information detecting means 1, a storing means which stores the wheel speeds, and a decompression judging means which judges decrease in tire air-pressure. The decompression judging means includes a sensitivity adjusting means which adjusts a sensitivity of judgment upon multiplying a specified sensitivity coefficient to the wheel rotational information of the respective wheels of the front axis or those of the respective wheels of the rear axis of the vehicle, a running judging means which judges a running condition of the vehicle, and a decompression judgment starting means which performs judgment of decrease in tire air-pressure, when it is determined that the vehicle is performing straight-ahead running, only on the basis of wheel rotational information when performing straight-ahead running.

Further, as stated above, when the vehicle is performing turning movements, the judged value DEL will be a value other than zero so that it is possible to correct this judged value DEL. The present embodiment is thus further provided with a correcting means which corrects the judged value DEL obtained by the decompression judging means during turning movements when it is judged that the vehicle is performing turning movements.

According to the present embodiment, a judged value DEL for judging decompression in which decrease in internal pressure is detected on the basis of a relative difference between wheel speeds can, for instance, be calculated from the following equation (8).

$$DEL=2\times\{(V1+V4)-(V2+V3)\}/(V1+V2+V3+V4)\times 100(\%) \quad (8)$$

Here, V1 to V4 (Vi=1 to 4) indicate wheel speeds of the front left tire, the front right tire, the rear left tire and the rear right tire, respectively.

As for the program for judging decompression of a tire according to the present embodiment, the control unit 2 is made to function as the storing means, the decompression judging means, the sensitivity adjusting means, the running judging means, the decompression judgment starting means, and the correcting means.

Whether the vehicle is performing straight-ahead running or whether the vehicle is performing turning movements can be judged, in the case where the vehicle is a FF (front engine/front drive) vehicle, by detecting the wheel speeds of the wheels, and monitoring a steering angle sensor. Pieces of steering angle information obtained from the steering sensor are converted into digital signals of 256 scales, wherein it is determined that the vehicle is performing straight-ahead running when the value falls within the range of 126 to 129, and in any other cases, that the vehicle is performing turning movements. Alternatively, a turning radius R is calculated from the following equation on the basis of wheel speeds V3, V4 of the following wheels. In this respect, the wheel speeds V3, V4 are corrected in view of lateral directional acceleration (lateral G) of the vehicle and changes owing to load such as passengers riding on the vehicle or goods packed onto the vehicle. Tw denotes a tread width. Where a reciprocal number 1/R of the turning radius R is zero, it is determined that the vehicle is running straight-ahead and where it is a value other than zero, that it is performing turning movements. The turning radius can also be calculated from the yaw rate and other besides the wheel speed.

$$R=\{(V4+V3)/(V4-V3)\} \times Tw/2$$

(1) A judged value obtained when it is determined that the vehicle is performing straight-ahead running will now be explained.

(i) When tires of the four wheels are of regular air-pressure, the wheel speed Vi of the respective tires will be the same velocity V so that the judged value DEL will be zero from the equation (8). In this respect, hereinafter, indication of percentage (%) will be omitted for ease of understanding of the judged values DEL obtained from the equation (8).

(ii) When only the rear right tire RR is decompressed, and the wheel speed V has increased to (V+αV), the judged value DEL is given as:

$$DEL=2\times\{(V+V+\alpha V)-(V+V)\}/(V+V+V+\alpha V)=2\alpha/(4+\alpha)$$

Here, when running tests are performed with the decompression being 30%, the judged value DEL will be approximately 0.0018, and since the coefficient α is sufficiently small (α<<1), $$DEL=(\alpha/2)$$

will be satisfied when supposing $4+\alpha \cong 4$. The judged value when the rear right tire RR is decompressed will accordingly be α/2 when performing straight-ahead running.

When a specified sensitivity coefficient β is multiplied to the wheel speeds V, (V+αV) of the rear wheel tires RL, RR with the rear right tire RR being decompressed, the judged value DEL will be $$DEL=2\times\{(V+\beta V+\alpha\beta V)-(V+\beta V)\}/(V+V+\beta V+\beta V+\alpha\beta V)$$

Here, since a<<1, β<1 (where β is a value smaller than 1 but close to 1), $$DEL=\beta(\alpha/2)$$

will be satisfied when supposing $2+\beta(2+\alpha)\cong 4$. It can thus be understood that a judged value obtained by multiplying a decompression coefficient β to the wheel speeds of the rear wheel tires will be β-times the judged value obtained without multiplication.

(iii) When only the front left tire FL is decompressed and the wheel speed V has increased to (V+αV), the judged value DEL will be $$DEL=2\times\{(V+\alpha V+V)-(V+V)\}/(V+\alpha V+V+V+V)=2\alpha/(4+\alpha)$$

Since α<<1, $$DEL=(\alpha/2)$$

will be satisfied when supposing $4+\alpha\cong 4$.

When a specified coefficient β is multiplied to the wheel speed V of the rear wheel tire similar to (ii), the judged value DEL will be $$DEL=2\times\{(V+\alpha V+\beta V)-(V+\beta V)\}/(V+\alpha V+V+\beta V+\beta V)=(\alpha/2)$$

It can therefore be understood therefrom that a judged value when a front wheel tire is decompressed obtained by multiplying the decompression coefficient β to the wheel speed of a rear wheel tire is α/2 and thus the same as in the case where the decompression coefficient β is not multiplied.

It can be understood from (ii) and (iii) of the above (1) that while the judged value obtained when a front wheel is decompressed during straight-ahead running is α/2, a judged value of a rear wheel will become β-times the judged value obtained with a decompressed front wheel by simply multiplying the sensitivity coefficient β to the wheel speed of the rear wheel tire.

It has thus become clear that no adverse effects (occurrence of factors that lead to erroneous alarm) are found by multiplying a sensitivity coefficient when considering the decompression sensitivity (judged value) when performing straight-ahead running. More particularly, in the present embodiment in which sensitivity correction has been performed, it is possible to judge decompression by excluding data obtained during turning movements.

(2) A judged value when it is determined that the vehicle is performing turning movements will now be explained.

(i) When the vehicle is performing, for instance, leftward turning, the wheel speed of the front left tire and the rear left tire on the inner wheel side will be (R−Tw/2)ω while the wheel speed of the front right tire and the rear right tire on the outer wheel side will be (R+Tw/2)ω, and when the four wheel tires are of regular air-pressure, the judged value DEL will be zero. In this respect, ω denotes an angular velocity.

(ii) Next, when only the rear right tire RR is decompressed and the wheel speed (R+Tw/2)ω has increased to (R+Tw/2)(1+α)ω, the judged value DEL will be $$DEL=2\times\{(R-Tw/2)\omega+(R+Tw/2)(1+\alpha)\omega-((R+Tw/2)\omega+$$

$$(R-Tw/2)\omega)\}/((R-Tw/2)\omega+(R+Tw/2)\omega+(R-Tw/2)\omega+$$

$$(R+Tw/2)(1+\alpha)\omega)$$

Similar to (ii) of above (1), $$DEL=(\alpha/2)(1+Tw/2R)$$

will be satisfied when supposing $4\{R+(R+Tw/2)\alpha\}\omega\cong 4R\omega$. Since TW/2R<<1, it can be understood that the judged value obtained when the rear wheel tire is decompressed during turning movements will be (α/2).

When a specified sensitivity coefficient β(<1) is multiplied to each of the wheel speeds (R−Tw/2)ω and (R+Tw/2)(1+α) of the rear wheel tires RL, RR with the rear right tire RR being decompressed, the judged value DEL will be $$DEL=(\alpha/2)(1+Tw/2R)\beta-(1-\beta)(Tw/2R).$$

Since $Tw/2R \ll 1$, it can be understood that the judged value obtained when the rear wheel tire is decompressed is a value which equals $(\alpha/2)$ multiplied by the sensitivity coefficient $\beta$ and deducted by the second term $((1-\beta)(Tw/2R))$.

(iii) When only the front left tire FL is decompressed and the wheel speed $(R-Tw/2)\omega$ has increased to $(R+Tw/2)(1+\alpha)\omega$, $$DEL=(\alpha/2)(1-Tw/2R)$$

will be satisfied. Since $Tw/2R \ll 1$ is satisfied, it can be understood that the judged value obtained when the front wheel tire is decompressed becomes $(\alpha/2)$.

When a specified sensitivity coefficient $\beta$ is multiplied to each of the wheel speeds $(R-Tw/2)\omega$ and $(R+Tw/2)\omega$ of the rear wheel tires similar to (ii), the judged value DEL will be $$DEL=(\alpha/2)(1-Tw/2R)-(1-\beta)(Tw/2R).$$

Since $Tw/2R \ll 1$, it can be understood that the judged value obtained when the front wheel tire is decompressed is a value which equals $(\alpha/2)$ deducted by the second term $((1-\beta)(Tw/2R))$.

The second term $((1-\beta)(Tw/2R))$ denotes a shift amount of the judged value DEL. When the judged value DEL is around 0.002, the shift amount will be approximately 0.001 when it is calculated on the basis of a tread width Tw of 1.5 m, a turning radius R of 100 m and a sensitivity coefficient of 0.85 and can thus not be ignored. Correction of this shift in the judged value thus needs to be considered. Since the turning radius R can be calculated from the yaw rate or the wheel speed, it is possible to perform correction by deducting the amount of shift of the second term from the judged value obtained during turning movements. Moreover, since the amount of shift might possibly shift from a theoretical calculated value, it is alternatively possible to preliminarily perform actual measurement of the shift amounts as functions of the turning radius R, the sensitivity coefficient $\beta$ and the tread width Tw using an actual car.

In this respect, while the present embodiment has been explained on the basis of a case in which the sensitivity coefficient $\beta$ is multiplied to the wheel speed of the rear wheel tire, it is also possible to multiply the sensitivity coefficient $\beta$ to the wheel speed of the front wheel tire.

While the present invention will now be explained on the basis of examples thereof, the present invention is not to be limited to such examples alone.

EXAMPLE 1

A FF (front engine/front drive) vehicle mounted with tires of normal air-pressure ($2.2 \times 10^5$ Pa) was provided as a vehicle. The tire size of the tires was 205/60R16. A running condition for the vehicle was a condition in which straight-ahead running and turning movements were repeatedly performed on a general roadway as indicated by the arrow V in FIG. 3.

Figure 3:
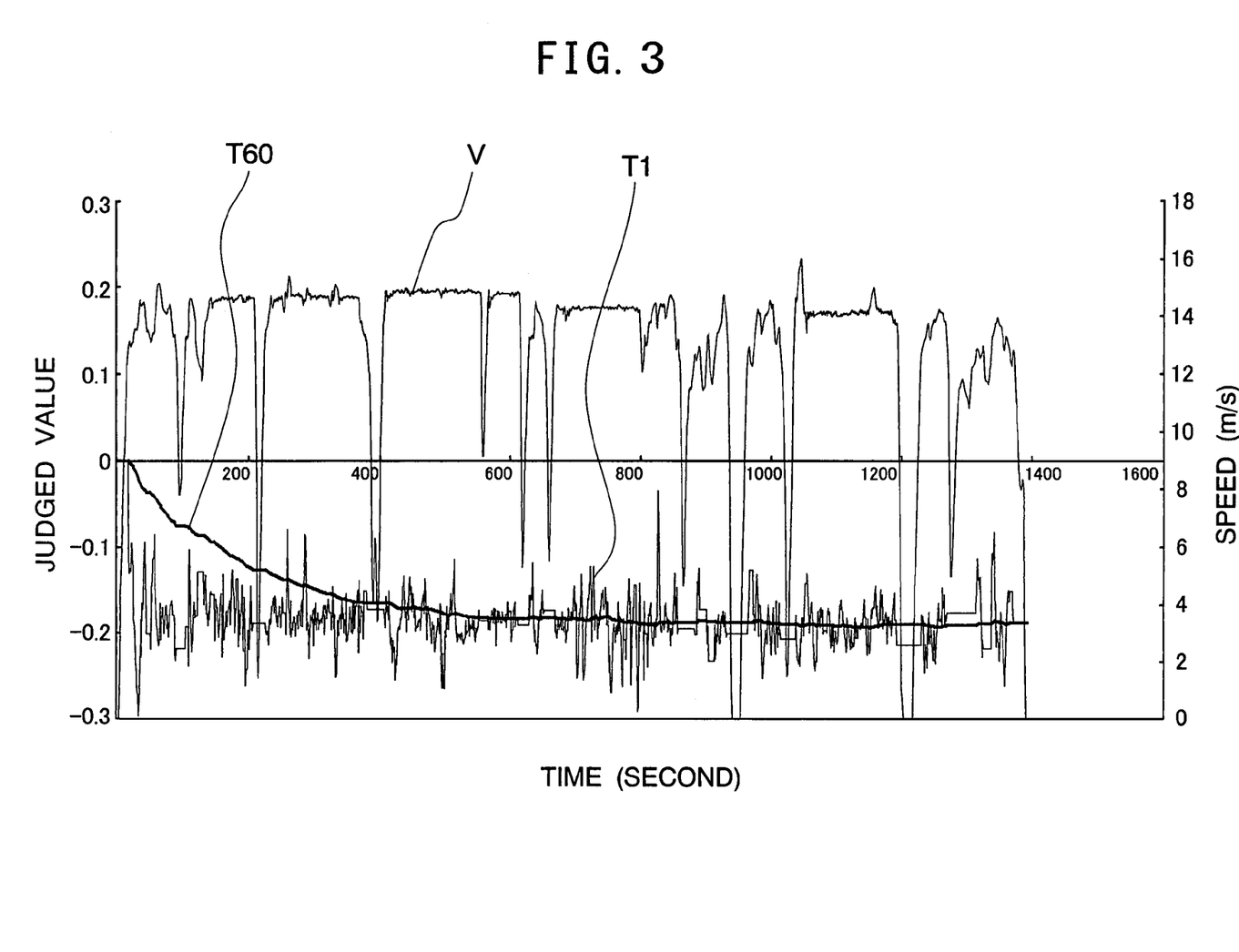
FIG. 3 is a view illustrating fluctuations in judged values (judged values per each second, moving averaged judged values per each 60 seconds) when no sensitivity correction is performed (when a reject for lateral G is 0.2 G)
Figure 4:
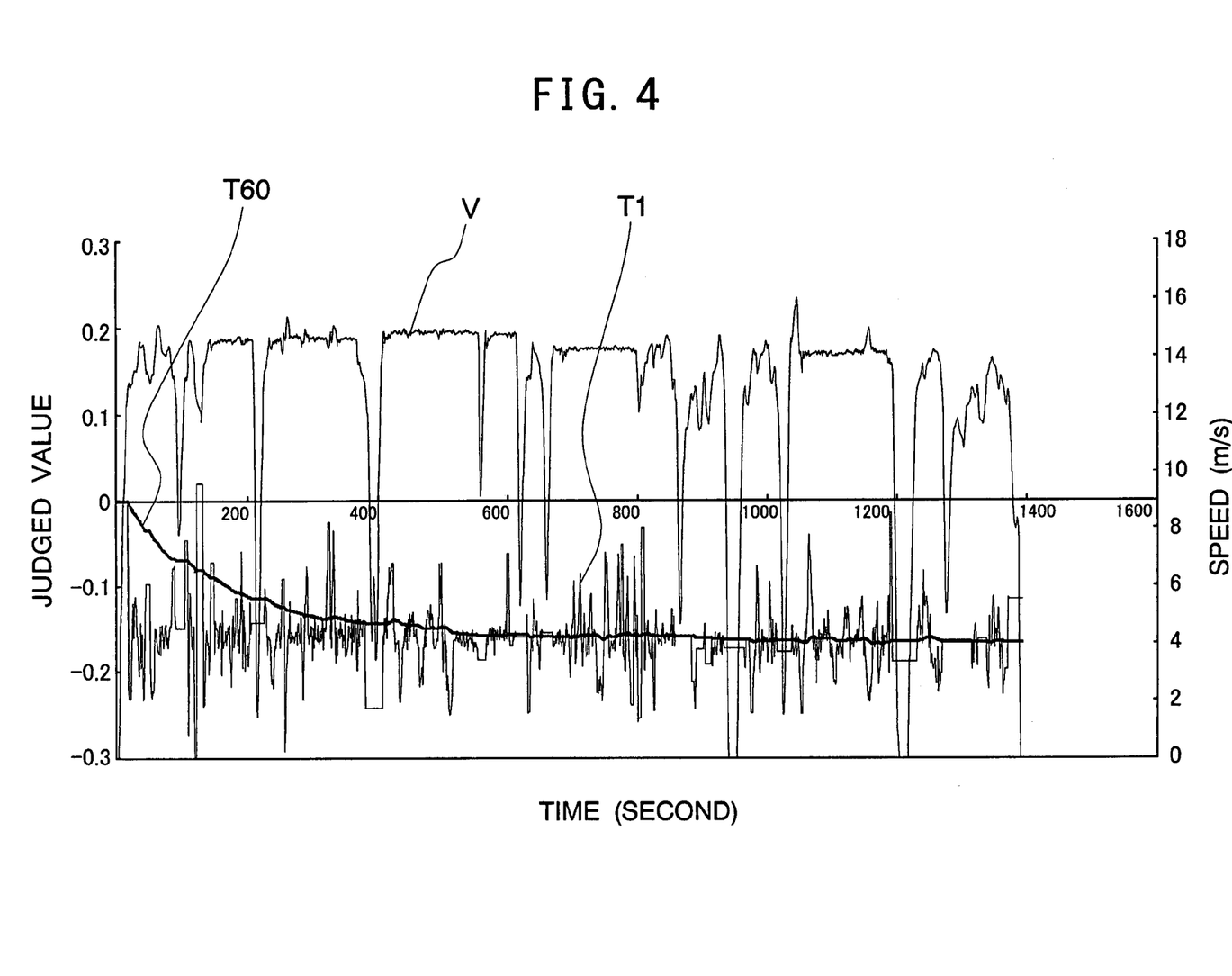
FIG. 4 is a view illustrating fluctuations in judged values (judged values per each second, moving averaged judged values per each 60 seconds) when sensitivity correction is performed (when a reject for lateral G is 0.2 G) according to Embodiment 1.
Figure 5:
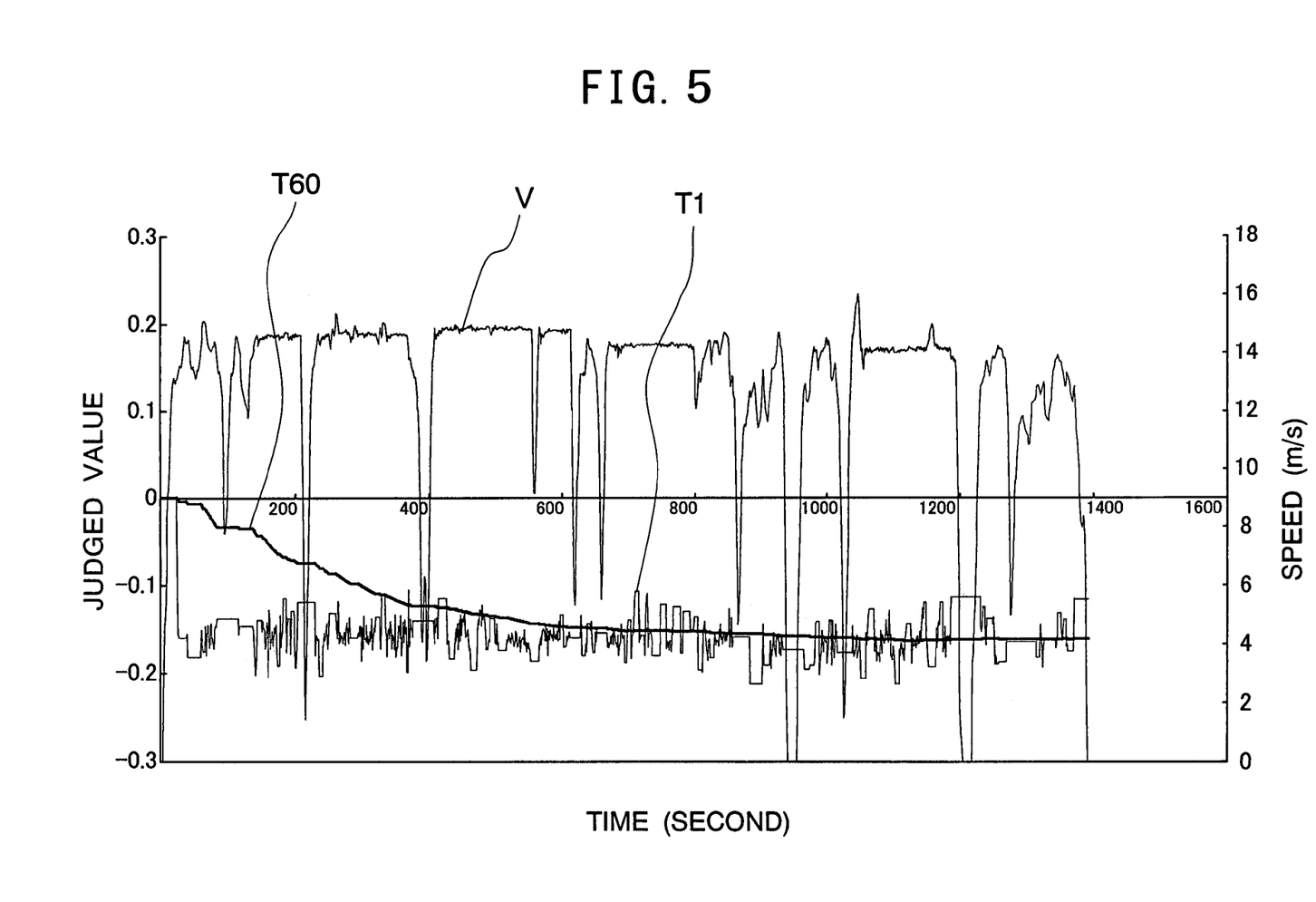
FIG. 5 is a view illustrating fluctuations in judged values (judged values per each second, moving averaged judged values per each 60 seconds) when sensitivity correction is performed (when a reject for lateral G is 0.06 G) according to Embodiment 1.

Upon mounting a detecting device storing therein the program for judging decompression of a tire according to the above embodiment, running tests were performed with only the rear left tire RL being decompressed by 20% (Example 1). Running tests in which no sensitivity correction was performed were also performed (Comparative Example). However, data were rejected where the |lateral G| was not less than 0.2 G since the sideslip was large. In performing sensitivity correction, 0.85 was employed as the sensitivity coefficient $\beta$, and this was multiplied to the rear wheel tire speed for calculating judged values. The comparative example thereof is illustrated in FIG. 3 and the Example 1 in FIG. 4. In FIGS. 3 and 4, T1 denote judged values with a sampling time of 1 second, and T60 denote judged values obtained after performing moving averaging for 60 seconds. It can be understood from FIGS. 3 and 4 that the T60 of Example 1 are smaller through introduction of sensitivity correction during straight-ahead running. In contrast thereto, judged values of T1 largely fluctuate in the present Example 1 owing to the presence of the amount of shift in the judged values when performing turning movements. Reject conditions for the lateral G were thus tightened and changed to 0.06 G for substantially rejecting data during turning movements. With this arrangement, it can be understood that fluctuations in T1 became smaller as illustrated in FIG. 5 and that influences of shift during turning movements can be eliminated through introduction of sensitivity correction during turning movements.

EXAMPLE 2

Figure 6:
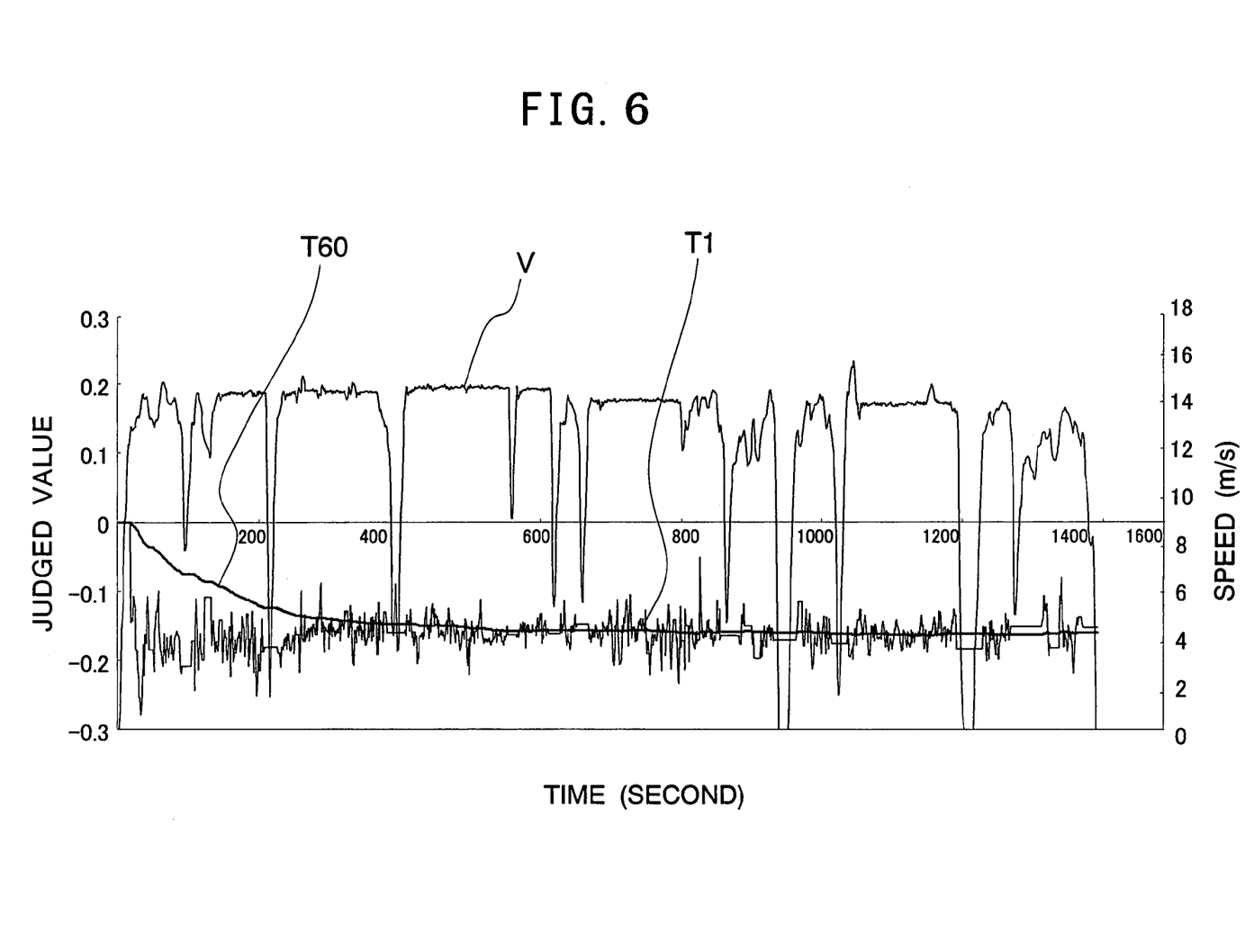
FIG. 6 is a view illustrating fluctuations in judged values (judged values per each second, moving averaged judged values per each 60 seconds) when sensitivity correction is performed (when a reject for lateral G is 0.2 G) according to Embodiment 2.
Figure 7:
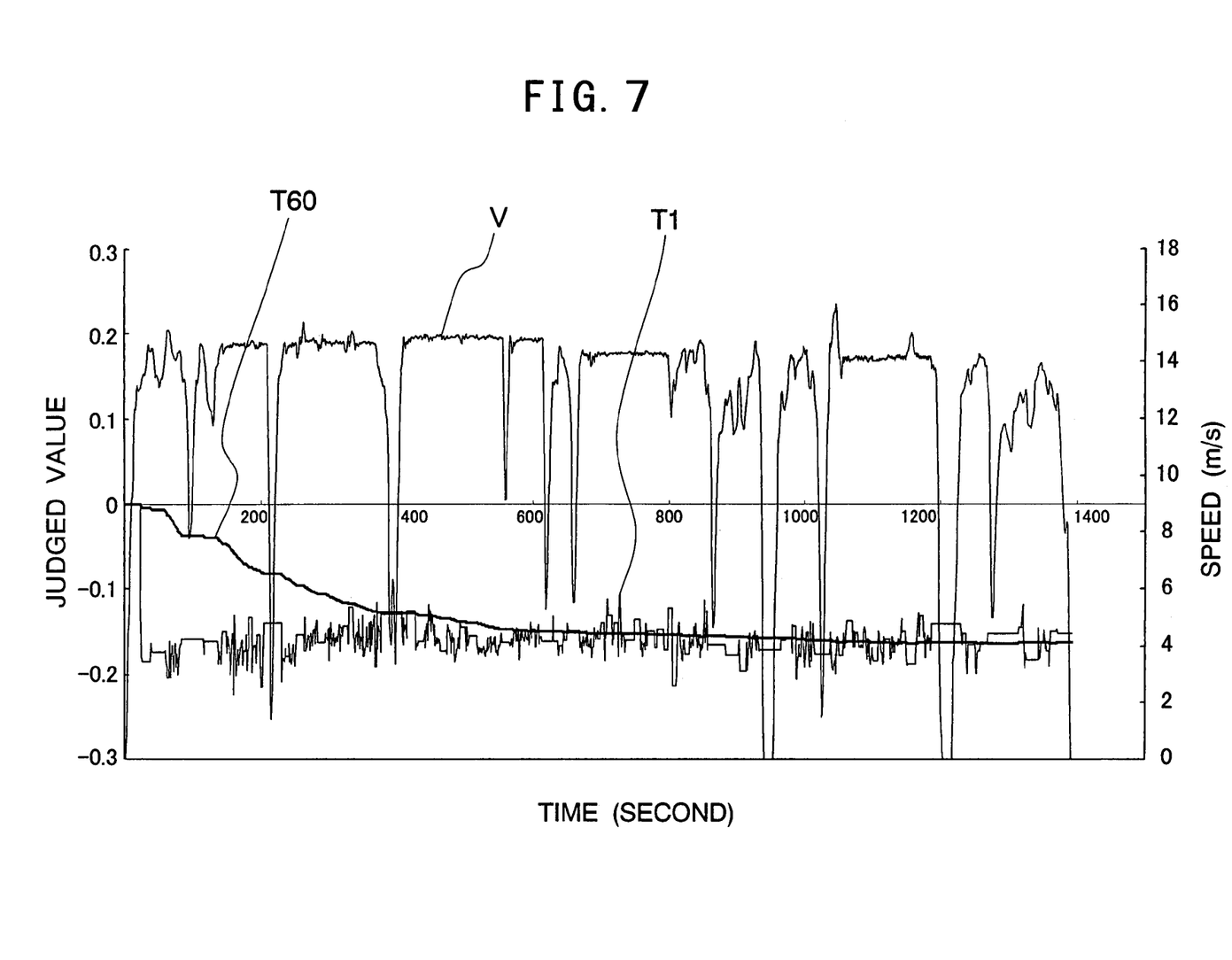
FIG. 7 is a view illustrating fluctuations in judged values judged values per each second, moving averaged judged values per each 60 seconds) when sensitivity correction is performed (when a reject of lateral G is 0.06 G) according to Embodiment 2.

In contrast to Example 1, Example 2 was devised to multiply 0.85 as the sensitivity coefficient $\beta$ to the rear wheel tire speed for correcting errors during turning movements caused by multiplying this sensitivity coefficient $\beta$. Results obtained with a reject condition for the lateral G being changed and tightened to 0.2 G and 0.06 G are shown in FIGS. 6 and 7. In this respect, in FIGS. 6 and 7, V, T1 and T60 respectively illustrate a vehicle velocity and judged values of each second and those obtained upon performing moving averaging for 60 seconds. As illustrated in FIGS. 6 and 7, it can be understood that fluctuations in the judged values T1 per each second are remarkably smaller when compared to those in which no error correction was performed (see FIGS. 4 and 5).

As explained so far, according to the present invention, it is possible to maintain detection accuracy of decrease in tire air-pressure and to prevent erroneous alarm.

What is claimed is:

1. A method for detecting decrease in tire air-pressure on the basis of wheel rotational information obtained from tires attached to a four-wheeled vehicle, comprising the steps of:
    obtaining wheel rotational information by subjecting rotational information obtained from the respective tires to an initial correction on the basis of the rotational information, to eliminate the influence of initial differences in the tires;
    storing the wheel rotational information; and
    judging decrease in air-pressure of a tire to obtain a judgment of decrease in tire air-pressure, wherein
        the step of judging decrease in air-pressure includes (1) adjusting a sensitivity of judgment by multiplying a specified sensitivity coefficient to the wheel rotational information of (a) the respective wheels of a front axis or (b) the respective wheels of a rear axis of the vehicle and (2) judging a running condition of the vehicle, and wherein
        when it is determined that the vehicle is performing straight-ahead running, the judgment of decrease in tire air-pressure is performed only on the basis of said wheel rotational information by eliminating data during turning movements when performing said straight-ahead running.

2. A method for detecting decrease in tire air-pressure on the basis of wheel rotational information obtained from tires attached to a four-wheeled vehicle, comprising the steps of:
    obtaining wheel rotational information by subjecting rotational information obtained from the respective tires to an initial correction on the basis of the rotational information, to eliminate the influence of initial differences in the tires;

storing the wheel rotational information; and judging decrease in air-pressure of a tire, wherein the step of judging decrease in air-pressure includes (1) adjusting a sensitivity of judgment by multiplying a specified sensitivity coefficient to the wheel rotational information of (a) the respective wheels of a front axis or (b) the respective wheels of a rear axis of the vehicle and (2) judging a running condition of the vehicle, and wherein a judged value for judging decease in tire air-pressure when performing turning movements is corrected on the basis of said wheel rotational information, said sensitivity coefficient, tread width and tuning radius when it is determined that the vehicle is performing said turning movements.

3. An apparatus for detecting decrease in tire air-pressure in which decrease in tire air-pressure is detected on the basis of wheel rotational information obtained from tires attached to a four-wheeled vehicle, comprising:

rotational information detecting means which obtain wheel rotational information by subjecting rotational information obtainable from the respective tires to an initial correction on the basis of the rotational information, to eliminate the influence of initial differences in the tires;

a storing means which stores the wheel rotational information; and a decompression judging means which judges decrease in air-pressure of a tire, wherein the decompression judging means includes a sensitivity adjusting means which adjusts a sensitivity of judgment by multiplying a specified sensitivity coefficient to the wheel rotational information of (a) the respective wheels of a front axis or (b) the respective wheels of a rear axis of the vehicle, a running judging means which judges a running condition of the vehicle, and a decompression judgment starting means which performs judgment of decrease in tire air-pressure, when it is determined that the vehicle is performing straight-ahead running, only on the basis of wheel rotational information by eliminating data during turning movements when performing straight-ahead running.

4. An apparatus for detecting decrease in tire air-pressure in which decrease in tire air-pressure is detected on the basis of wheel rotational information obtained from tires attached to a four-wheeled vehicle, comprising:

rotational information detecting means which obtain wheel rotational information by subjecting rotational information obtainable from the respective tires to an initial correction on the basis of the rotational information, to eliminate the influence of initial differences in the tires;

a storing means which stores the wheel rotational information; and a decompression judging means which judges decrease in air-pressure of a tire to obtain a judged value, wherein the decompression judging means includes a sensitivity adjusting means which adjusts a sensitivity of judgment by multiplying a specified sensitivity coefficient to the wheel rotational information of (a) the respective wheels of a front axis or (b) the respective wheels of a rear axis of the vehicle, a ring judging means which judges a running condition of the vehicle, and a correcting means which corrects the judged value when performing turning movements obtained by the decompression judging means on the basis of said wheel rotational information, said sensitivity coefficient, tread width and tuning radius when it is determined that the vehicle is performing said tuning movements.

5. A computer readable medium for storing a program for judging decompression of a tire, in which for judging decrease in tire air-pressure on the basis of wheel rotational information obtained from tires attached to a four-wheeled vehicle, a computer uses said program to function as a storing means which stores wheel rotational information, obtained by subjecting rotational information obtained from the respective tires to an initial correction on the basis of the rotational information, to eliminate the influence of initial differences in the tires, a decompression judging means which judges decrease in air-pressure of a tire, a sensitivity adjusting means which adjusts a sensitivity of judgment by multiplying a specified sensitivity coefficient to the wheel rotational information of (a) the respective wheels of a front axis or (b) the respective wheels of a rear axis of the vehicle, a running judging means which judges a running condition of the vehicle, and a decompression judgment staring means which performs judgment of decrease in tire air-pressure, when it is determined that the vehicle is performing straight-ahead running, only on the basis of said wheel rotational information by eliminating data during turning movements when performing said straight-ahead running.

6. A computer readable medium for storing a program for judging decompression of a tire, in which for judging decrease in tire air-pressure on the basis of wheel rotational information obtained from tires attached to a four-wheeled vehicle, a computer uses said program to function as a storing means which stores the wheel rotational information, obtained by subjecting rotational information obtained from the respective tires to an initial correction on the basis of the rotational information, to eliminate the influence of initial differences in the tires, a decompression judging means which judges decrease in air-pressure of a tire to obtain a judged value, a sensitivity adjusting means which adjusts a sensitivity of judgment upon multiplying a specified sensitivity coefficient to the wheel rotational information of (a) the respective wheels of a front axis or (b) the respective wheels of a rear axis of the vehicle, a running judging means which judges a running condition of the vehicle, and a correcting means which corrects the judged value when performing turning movements obtained by the decompression judging means on the basis of said wheel rotational information, said sensitivity coefficient, tread width and turning radius when it is determined that the vehicle is performing said turning movements.

* * * * *

UNITED STATES PATENT AND TRADEMARK OFFICE
CERTIFICATE OF CORRECTION

PATENT NO. : 7,305,288 B2  Page 1 of 1
APPLICATION NO. : 10/842579
DATED : December 4, 2007
INVENTOR(S) : Minao Yanase It is certified that error appears in the above-identified patent and that said Letters Patent is hereby corrected as shown below:

Title Page Item 73, change the Assignee's name from "Sri Sports Limited, Kobe (JP)" to --Sumitomo Rubber Industries, Ltd., Kobe (JP)--

Signed and Sealed this

Twenty-third Day of March, 2010

David J. Kappos
*Director of the United States Patent and Trademark Office*